(12) United States Patent
Miyahara

(10) Patent No.: US 6,625,240 B1
(45) Date of Patent: Sep. 23, 2003

(54) BYTE ALIGNMENT/FRAME SYNCHRONIZATION APPARATUS

(75) Inventor: Yasuhiro Miyahara, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/562,941

(22) Filed: May 2, 2000

(30) Foreign Application Priority Data

May 7, 1999 (JP) .......................................... 11-127352

(51) Int. Cl.[7] .............................................. H04L 7/00
(52) U.S. Cl. ........................ 375/366; 375/368; 370/513
(58) Field of Search ................................. 375/354, 362, 375/364, 365, 366, 368; 370/510, 511, 512, 513, 514

(56) References Cited

U.S. PATENT DOCUMENTS

| 5,400,369 A | * 3/1995 | Ikemura ...................... 375/368 |
| 5,559,983 A | * 9/1996 | Masood ....................... 711/112 |
| 5,708,685 A | 1/1998 | Kim |
| 5,710,774 A | 1/1998 | Suh et al. |
| 5,862,143 A | 1/1999 | Suh |

FOREIGN PATENT DOCUMENTS

| JP | 08-163116 A | 6/1996 |
| JP | 9-181697 | 7/1997 |
| JP | 09-181697 A | 7/1997 |
| JP | 09-181714 A | 7/1997 |

* cited by examiner

*Primary Examiner*—Don N. Vo
(74) *Attorney, Agent, or Firm*—Foley & Lardner

(57) ABSTRACT

In an alignment/frame synchronization apparatus, a RSB frequency-dividing circuit generates a second clock. A data width extension circuit extends eight input data into 16 output data. A byte alignment circuit generates byte signals, and byte-aligns the output signals in accordance with a byte alignment control signal. A control circuit outputs byte alignment control signals to the byte alignment circuit in correspondence with the byte signals in accordance with detection of A1A1 and A2A2 patterns, and outputs an A1/A2 consecutive pattern signal indicating the reception of a predetermined number of consecutive A1 and A2 frame patterns. A frame pulse generating circuit generates a frame pulse signal when an A2 frame pattern is received following an A1 frame pattern. A frame sync detection circuit generates a frame sync signal when the frame pulse signal output is consecutively received a first predetermined number of times. A frame sync loss detection circuit outputs a frame sync loss signal when the frame sync signal output is not consecutively received a second predetermined number of times. A frame sync error detection circuit outputs a frame sync error signal in synchronism with the second clock when it is detected that the frame sync loss signal is maintained for a predetermined period of time.

4 Claims, 4 Drawing Sheets

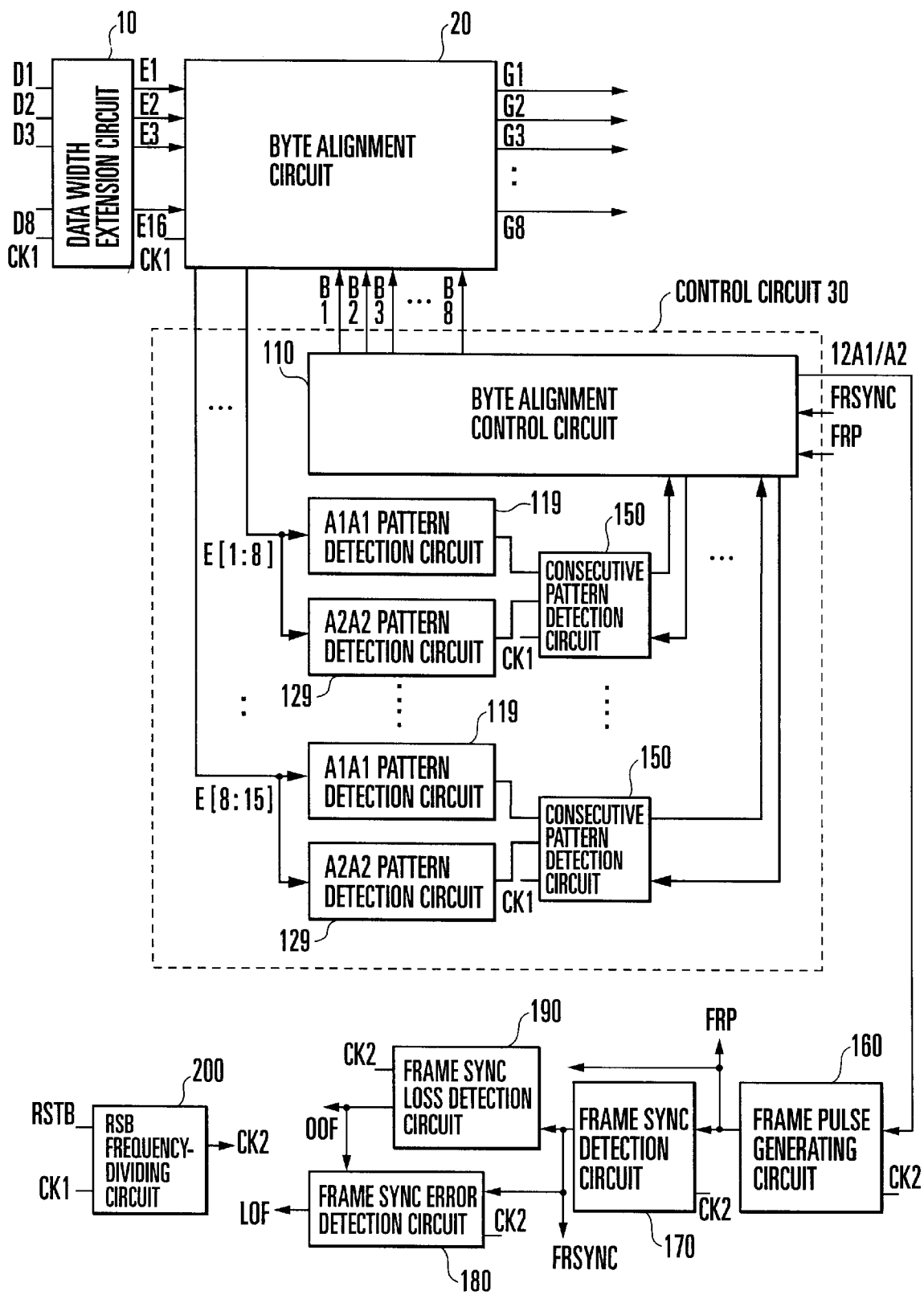
F I G. 1

| EFFECTIVE FRAME 1 | EFFECTIVE FRAME 2 | FRAME SYNCHRONIZATION | FRAME SYNCHRONIZATION | FRAME SYNCHRONIZATION | FRAME SYNCHRONIZATION | FRAME SYNCHRONIZATION |

BYTE ALIGNMENT/FRAME SYNCHRONIZATION APPARATUS

BACKGROUND OF THE INVENTION

The present invention relates to a byte alignment/frame synchronization circuit and, more particularly, to a byte alignment/frame synchronization circuit suitable for processing high-speed data.

In transmitting information from a broadband, ultra-high-speed information network, a circuit may be configured to directly process serial data at a rate of about 622 Mbits/s. Such a circuit is, however, difficult to implement because it requires a complicated manufacturing process and high-speed data processing produces much noise. In general, therefore, a scheme of converting high-speed serial reception data into low-speed parallel data in units of bytes is used. In this case, since the serial-parallel conversion function based on arbitrary section setting cannot detect a correct MSB (Most Significant Bit) and LSB (Least Significant Bit) in data sent in units of bytes from the transmitter, the receiving unit requires a byte alignment function.

A 622-Mbit/s transmitter basically transmits information upon collecting it in units of frames each having a period of 125 μs. At this time, the transmission circuit inserts a frame sync signal, and the reception circuit extracts the frame sync signal, thereby performing byte alignment for the received data and establishing frame synchronization on the basis of the aligned data.

FIG. 3 shows a byte alignment/frame synchronization apparatus which is used for the 622-Mbit/s transmitter disclosed in Japanese Patent Laid-Open No. 9-181697 (reference 1) to perform byte alignment, frame sync detection, and frame sync error detection. In the 622-Mbit/s transmitter, a frame byte is basically constituted by 12 consecutive A1 bytes ("111101110") and 12 consecutive A2 bytes ("00101000") in a frame having a period of 125 μs.

Referring to FIG. 3, a data width extension circuit 210 converts eight parallel bits D1 to D8 into 16 parallel bits (first to 16th parallel bits) E1 to E16 in accordance with a clock (first clock) CK1, and outputs them. A byte alignment control circuit 310 generates byte alignment control signals B1 to B8 required for byte alignment from the parallel bits E1 to E16 in synchronism with the clock CK1, and outputs them to a byte alignment circuit 220.

The byte alignment circuit 220 byte-aligns the parallel bits E1 to E16 on the basis of the byte alignment control signals B1 to B8. An A1A1 pattern detection circuit 319 detects two consecutive A1 bytes from 16 byte-aligned signals G1 to G16 output from the byte alignment circuit 220. An A2A2 pattern detection circuit 329 detects two consecutive A2 bytes from the 16 byte-aligned signals G1 to G16.

A pattern selection circuit 340 selects an output from the A1A1 pattern detection circuit 319 or A2A2 pattern detection circuit 329, and outputs it as a signal SELOUT. A consecutive pattern detection circuit 350 detects, on the basis of the signal SELOUT, whether six consecutive A1A1 patterns or six consecutive A2A2 patterns are received, and outputs an A1/A2 consecutive pattern signal 12A1/A2.

A frame pulse generating circuit 360 detects, on the basis of the A1/A2 consecutive pattern signal 12A1/A2, whether six consecutive A2A2 patterns received in six consecutive A1A1 patterns, and outputs a frame pulse signal FRP. A frame sync detection circuit 370 detects whether the frame pulse signal FRP is consecutively received twice, and generates a frame sync signal FRSYNC.

A frame sync loss detection circuit 390 detects whether the frame sync signal FRSYNC is not consecutively received four times, and generates a frame sync loss signal 00F. A frame sync error detection circuit 380 detects whether the frame sync loss signal 00F is maintained for 3 msec, and generates a frame sync error signal LOF.

A frequency-dividing circuit 400 divides the clock CK1 by two to generate a clock (second clock) CK2 serving as an operating clock for the pattern selection circuit 340, consecutive pattern detection circuit 350, frame pulse generating circuit 360, frame sync detection circuit 370, frame sync error detection circuit 380, and frame sync loss detection circuit 390.

The above conventional byte alignment control circuit 310 generates the byte alignment control signals B1 to B8 required for byte alignment from the 16 parallel bits E1 to E16 in synchornism with the clock CK1 and stores the values of the generated signals in built-in flip-flops every time the frame sync loss detection circuit 390, consecutive pattern detection circuit 350, frame pulse generating circuit 360, and frame sync detection circuit 370 output the frame sync loss signal 00F, A1/A2 consecutive pattern signal 12A1/A2, frame pulse signal FRP, and frame sync signal FRSYNC, respectively.

The detailed arrangement of the byte alignment control circuit 310 that performs the above operation is described in reference 1.

In this case, the A1/A2 consecutive pattern signal 12A1/A2, frame pulse signal FRP, and frame sync signal FRSYNC are not generated unless A1 and A2 bytes are detected. If frames that are consecutively input first are frames (effective frames) in which A1 and A2 bytes are detected, frame synchronization can be quickly established. If they are not effective frames, frame synchronization cannot be established.

In the byte alignment control circuit 310 described above, therefore, it therefore may take one to eight frames until A1 and A2 bytes coincide with each other. That is, dummy frame data corresponding to a maximum of seven frames may be received until a necessary frame is received.

Figure 4:
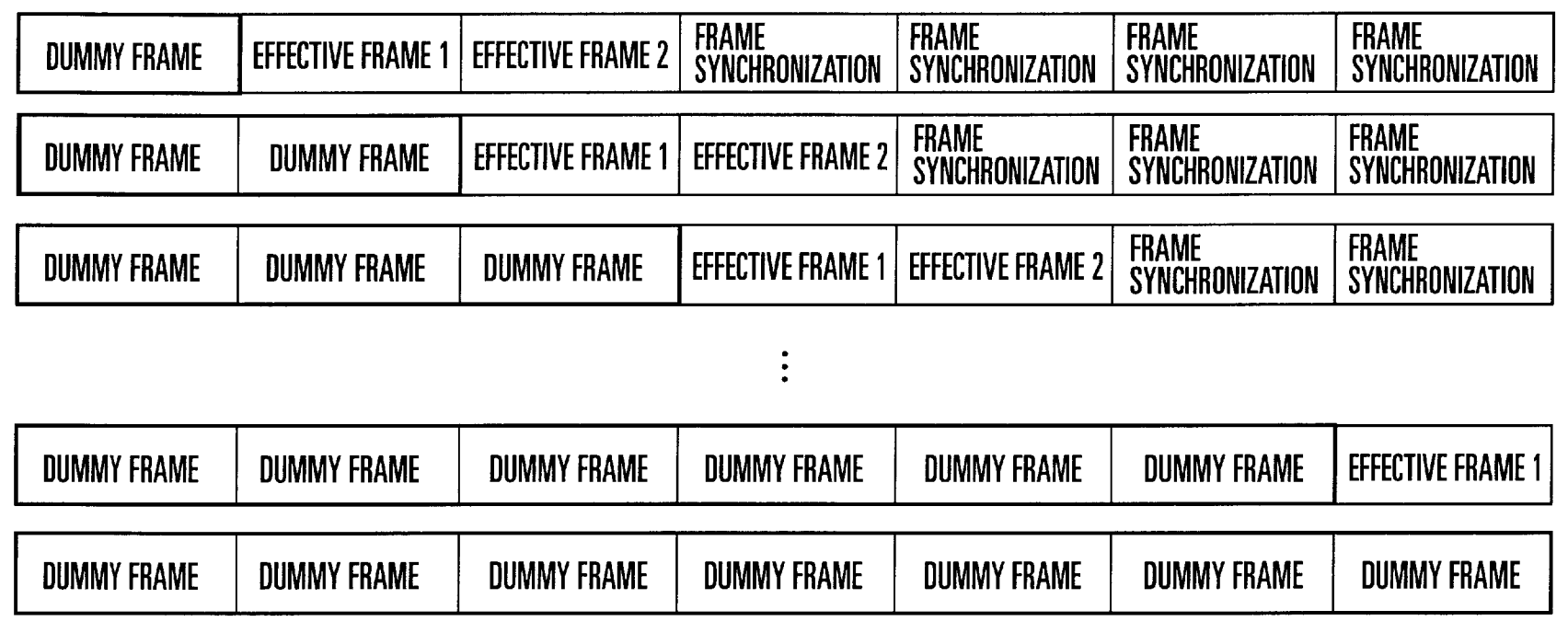

FIG. 4 shows cases each indicating how frame synchronization is established by the byte alignment control circuit 310 described above when the first input frame is a dummy frame.

SUMMARY OF THE INVENTION

It is an object of the present invention to realize an alignment/frame synchronization apparatus which can quickly perform frame synchronization.

In order to achieve the above object, according to the present invention, there is provided an alignment/frame synchronization apparatus comprising frequency-dividing means for frequency-dividing a first clock to generate a second clock, data width extension means for extending eight input data into 16 output data E[1:16] in accordance with the first clock, byte alignment means for generating byte signals E[m:m+7] (m=integers of 1 to 8) from the output signals E[1:16] from the data width extension means, and byte-aligning the output signals E[1:16] from the data width extension means on the basis of a byte alignment control signal, control means for outputting byte alignment control signals to the byte alignment means in correspondence with the byte signals [m:m+7] in accordance with detection of A1A1 patterns and A2A2 patterns for the respective byte signals [m:m+7] from the byte alignment means, and outputting an A1/A2 consecutive pattern signal indicating that a predetermined number of A1 and A2 frame patterns are consecutively received, frame pulse generating means for generating a frame pulse signal in synchronism with the second clock when an A2 frame pattern is consecutively received following an A1 frame pattern on the basis of the A1/A2 consecutive pattern signal output from the control means, frame sync detection means for generating a frame sync signal in synchronism with the second clock when the frame pulse signal output from the frame pulse generating means is consecutively received a first predetermined number of times, frame sync loss detection means for outputting a frame sync loss signal when the frame sync signal output from the frame sync detection means is not consecutively received a second predetermined number of times, and frame sync error detection means for outputting a frame sync error signal in synchronism with the second clock when it is detected that the frame sync loss signal output from the frame sync loss detection means is maintained for a predetermined period of time.

BRIEF DESCRIPTION OF THE DRAWINGS

FIG. 1 is a block diagram showing a byte alignment/frame synchronization apparatus according to an embodiment of the present invention;

FIG. 2 is a view showing the transition state of data until frame synchronization in the apparatus shown in FIG. 1;

FIG. 4 is a view showing the transition state of data until frame synchronization in the conventional apparatus.

DESCRIPTION OF THE PREFERRED EMBODIMENTS

Figure 3:
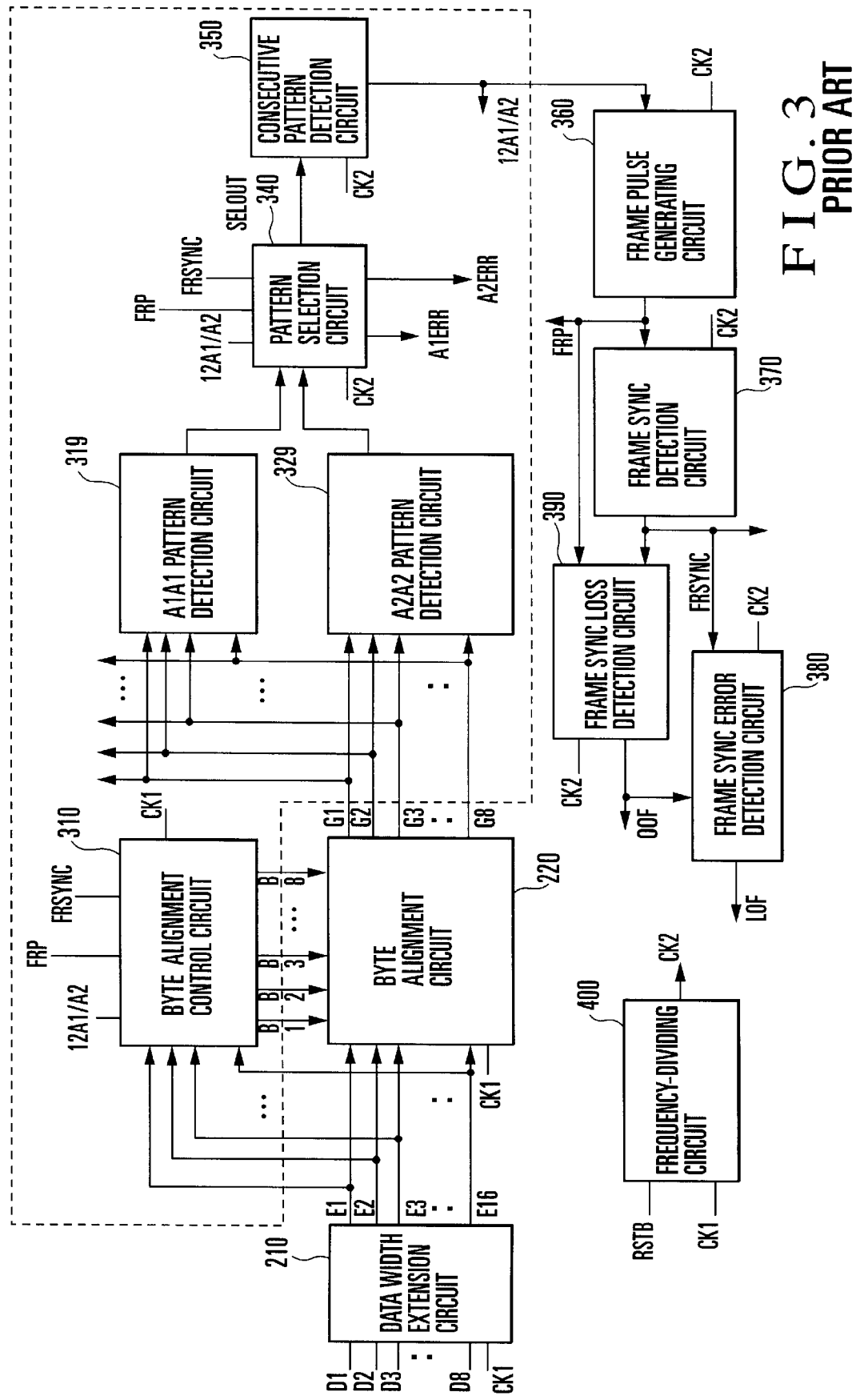
FIG. 3 is a block diagram showing a conventional byte alignment/frame synchronization apparatus.

The present invention will be described in detail with reference to the accompanying drawings.

FIG. 1 shows a byte alignment/frame synchronization apparatus. As described above, in a 622-Mbit/s transmitter, frame bytes are basically constituted by twelve consecutive A1 bytes and twelve consecutive A2 bytes in a frame having a period of 125 $\mu$s. The apparatus according to this embodiment is used for a 622-Mbit/s transmitter designed to perform frame synchronization by using such frame bytes as in the prior art shown in FIG. 3. This apparatus performs byte alignment, frame sync detection, and frame sync error detection.

The byte alignment/frame synchronization apparatus of this embodiment is comprised of a data width extension circuit 10, a byte alignment circuit 20 that receives an output from the data width extension circuit 10, a control circuit 30 connected to the byte alignment circuit 20, a frame pulse generating circuit 160 that receives an output from the control circuit 30, a frame sync detection circuit 170 that receives an output from the frame pulse generating circuit 160, a frame sync loss detection circuit 190 that receives an output from the frame sync detection circuit 170, a frame sync error detection circuit 180 that receives outputs from the frame sync detection circuit 170 and frame sync loss detection circuit 190, and an RSB frequency-dividing circuit 200 for frequency-dividing a clock and outputting frequency-divided clocks.

The control circuit 30 includes a byte alignment control circuit 110 for controlling the byte alignment circuit 20, eight pairs of A1A1 pattern detection circuits 119 and A2A2 pattern detection circuits 129 that receive outputs from the byte alignment circuit 20, and a plurality of consecutive pattern detection circuits 150 that receive outputs from the A1A1 pattern detection circuits 119 and A2A2 pattern detection circuits 129 and are connected to the byte alignment control circuit 110.

The data width extension circuit 10, frame pulse generating circuit 160, frame sync detection circuit 170, frame sync error detection circuit 180, frame sync loss detection circuit 190, and RSB frequency-dividing circuit 200 have the same arrangements as those of the data width extension circuit 210, frame pulse generating circuit 360, frame sync detection circuit 370, frame sync error detection circuit 380, frame sync loss detection circuit 390, and RSB frequency-dividing circuit 400 in the prior art shown in FIG. 3.

The data width extension circuit 10 converts eight parallel bits D1 to D8 into 16 parallel bits E1 to E16 in accordance with CK1, and outputs them. The byte alignment circuit 20 byte-aligns the 16 parallel bits E1 to E16 on the basis of byte alignment control signals B1 to B8 from the byte alignment control circuit 110. The byte alignment circuit 20 sends out E[1:8:], E[2:9], . . . , E[8:15] aligned in units of bytes.

In this embodiment, as described above, the combinations of the A1A1 pattern detection circuits 119, A2A2 pattern detection circuits 129, and consecutive pattern detection circuits 150 are arranged in correspondence with E[1:8:], E[2:9], . . . , E[8:15] aligned in units of bytes.

Each A1A1 pattern detection circuit 119 detects coincidence between two consecutive A1 bytes and outputs a detection signal. Each A2A2 pattern detection circuit 129 detects coincidence between two consecutive A2 bytes and outputs a detection signal. Each consecutive pattern detection circuit 150 detects, on the basis of the detection signals from the corresponding A1A1 pattern detection circuit 119 and A2A2 pattern detection circuit 129, whether two consecutive A1A1 patterns or A2A2 patterns are received, and outputs a detection signal to the byte alignment control circuit 110.

The above operation will be described in detail below. The byte alignment circuit 20 generates data in units of bytes corresponding to E[m:m+7] (m=integers of 1 to 8) bytes from output signals E[1:16] from the data width extension circuit 10. The combinations of the A1A1 pattern detection circuits 119, A2A2 pattern detection circuits 129, and consecutive pattern detection circuits 150, which are arranged in correspondence with the data in units of bytes, perform A1A1 pattern detection and A2A2 pattern detection.

Upon reception of a signal representing the detection result, the byte alignment control circuit 110 sets an output signal Bm from the byte alignment control circuit 110 at high level in correspondence with E[m:m+7] bytes from which consecutive patterns are detected, and outputs the signal Bm to the byte alignment circuit 20. The byte alignment circuit 20 then outputs an output signal G[1:8]. In this case, G[1:8] is equivalent to E[m:m+7] delayed by m clocks (CK1).

In this embodiment, the combinations of the A1A1 pattern detection circuits 119, A2A2 pattern detection circuits 129, and consecutive pattern detection circuits 150 are arranged in correspondence with E[1:8], E[2:9], . . . , E[8:15] aligned in units of bytes as described above. If, therefore, the byte alignment circuit 20 sends out E[1:8:], E[2:9], . . . , E[8:15] aligned in units of bytes, one of the A1A1 pattern detection circuits 119 and A2A2 pattern detection circuits 129 outputs a coincidence signal.

The byte alignment control circuit 110 generates the byte alignment control signals B1 to B8 serving as control signals required for byte alignment in synchronism with the clock CK1 on the basis of outputs from the respective consecutive pattern detection circuits 150, and outputs the signals B1 to B8 to the byte alignment circuit 20. At the same time, the byte alignment control circuit 110 outputs an A1/A2 consecutive pattern signal 12A1/A2 to the frame pulse generating circuit 160.

The frame pulse generating circuit 160 outputs a frame pulse signal FRP on the basis of the A1/A2 consecutive pattern signal 12A1/A2. The frame sync detection circuit 170 detects whether the frame pulse signal FRP is consecutively received twice, and generates a frame sync signal FRSYNC.

The frame sync loss detection circuit 190 detects whether the frame sync signal FRSYNC is consecutively received four times, and generates a frame sync loss signal 00F. The frame sync error detection circuit 180 detects whether the frame sync loss signal 00F is maintained for 3 msec, and generates a frame sync error signal LOF. The RSB frequency-dividing circuit 200 divides the clock CK1 by two to generate a clock CK2.

FIG. 2 shows the transition state of data until frame synchronization. In this embodiment, two frames (effective frames 1 and 2) containing frame sync signals are input to D1 to D8, the data width extension circuit 10 generates the 16 parallel bits E1 to E16. The byte alignment circuit 20 then byte-aligns the parallel bits into E[1:8:], E[2:9], . . . , E[8:15]. Since the combinations of the A1A1 pattern detection circuits 119, A2A2 pattern detection circuits 129, and consecutive pattern detection circuits 150 are arranged in correspondence with these bytes, respectively, when E[1:8:], E[2:9], . . . , E[8:15] aligned in units of bytes are sent out from the byte alignment circuit 20, a coincidence signal is immediately output from one of the A1A1 pattern detection circuits 119 and A2A2 pattern detection circuits 129, thereby reliably establishing frame synchronization.

Even in a state wherein MSB and LSB cannot be correctly detected in data in units of bytes, when the byte alignment circuit 20 inputs two frames (effective frames 1 and 2) containing frame sync signals to D1 to D8, frame synchronization can be reliably established.

As is obvious from the above description, according to the present invention, the output signals E[1:16] from the data width extension circuit are divided into the byte signals E[1:8:], E[2:9], . . . , E[8:15], and the combinations of A1A1 pattern detection circuits, A2A2 pattern detection circuits, and consecutive pattern detection circuits are arranged in correspondence with the respective bytes. With this arrangement, no dummy frame data needs to be received before a necessary frame.

Assume that frame synchronization is lost due to some reason. In this case, frame synchronization can be quickly and reliably re-established by using two frames (corresponding to the number of preceding protective frames).

As a consequence, the operation of an ATM (Asynchronous Transfer Mode)-LAN/WAN-PHY (Physical Layer Protocol) circuit, e.g., an apparatus incorporating a PHY LSI, can be easily controlled without preparing any dummy frame containing a frame sync signal. This makes it possible to reduce the cost of an ATM communication apparatus.

What is claimed is:

1. An alignment/frame synchronization apparatus comprising:

frequency-dividing means for frequency-dividing a first clock to generate a second clock;

data width extension means for extending eight input data into 16 output data E[1:16] in accordance with the first clock;

byte alignment means for generating byte signals E[m:m+7] (m=integers of 1 to 8) from the output signals E[1:16] from said data width extension means, and byte-aligning the output signals E[1:16] from said data width extension means on the basis of a byte alignment control signal;

control means for outputting byte alignment control signals to said byte alignment means in correspondence with the byte signals [m:m+7] in accordance with detection of A1A1 patterns and A2A2 patterns for the respective byte signals [m:m+7] from said byte alignment means, and outputting an A1/A2 consecutive pattern signal indicating that a predetermined number of A1 and A2 frame patterns are consecutively received;

frame pulse generating means for generating a frame pulse signal in synchronism with the second clock when an A2 frame pattern is consecutively received following an A1 frame pattern on the basis of the A1/A2 consecutive pattern signal output from said control means;

frame sync detection means for generating a frame sync signal in synchronism with the second clock when the frame pulse signal output from said frame pulse generating means is consecutively received a first predetermined number of times;

frame sync loss detection means for outputting a frame sync loss signal when the frame sync signal output from said frame sync detection means is not consecutively received a second predetermined number of times; and frame sync error detection means for outputting a frame sync error signal in synchronism with the second clock when it is detected that the frame sync loss signal output from said frame sync loss detection means is maintained for a predetermined period of time.

2. An apparatus according to claim 1, wherein said control means comprises:

m pairs of A1A1 pattern detection means and m A2A2 pattern detection means arranged in correspondence with the byte signals from said byte alignment means, each of said m pairs being adopted to detect two consecutive A1 and A2 frame patterns and output detection signals;

m consecutive pattern detection means for detecting, on the basis of each of the detection outputs from said A1A1 pattern detection means and said A2A2 pattern detection means, whether one of two consecutive A1A1 and A2A2 patterns is detected; and byte alignment control means for, when said consecutive pattern detection means detects consecutive patterns, outputting, to said byte alignment means, a byte alignment control signal corresponding to E[m:m+7] bytes in which the consecutive patterns are detected, and outputting, to said byte alignment control means, an A1/A2 consecutive pattern signal indicating that predetermined numbers of A1 and A2 frame patterns are consecutively received.

3. An apparatus according to claim 1, wherein said frame sync detection means generates a frame sync signal when the frame pulse signal output from said frame pulse generating means is consecutively received two times as the first predetermined number of times.

4. An apparatus according to claim 1, wherein said frame sync loss detection means outputs a frame sync loss signal when the frame sync signal output from said frame sync detection means is not consecutively detected four times as the second predetermined number of times.

* * * * *